United States Patent [19]

Papp et al.

[11] Patent Number: 5,071,566

[45] Date of Patent: Dec. 10, 1991

[54] PROCESS FOR THE SEPARATION OF SOLID PHASE FROM LIQUID SUBSTANCE, PARTICULARLY FOR WASTE WATER PURIFICATION

[75] Inventors: Endre Papp, Budapest; István Papp; Lajos Szabó, both of Siófok; István Apró, Szolnok; Gyula Czepek, Szolnok; Ferenc Törőcsik, Szolnok; Béle Konkoly, Szolnok; Pál Karcagi, Szolnok; János Takács, Szolnok; Tamás Földi, Budapest, all of Hungary

[73] Assignee: Innoterv Ipari Fővállalkozó Kisszövetkezet, Budapest, Hungary

[21] Appl. No.: 401,798

[22] Filed: Sep. 1, 1989

[51] Int. Cl.$^5$ .............................................. B01D 21/01
[52] U.S. Cl. ..................................... 210/713; 210/727; 210/728; 210/199
[58] Field of Search ............... 210/713, 723, 728, 199, 210/738, 727, 725

[56] References Cited

U.S. PATENT DOCUMENTS

| 3,247,105 | 4/1966 | Gustafson | 210/713 |
| 3,446,742 | 5/1969 | Bacon | 210/723 |
| 3,887,462 | 6/1975 | Lagess et al. | 210/42 |
| 3,975,269 | 8/1976 | Ramirez | 210/707 |
| 4,383,928 | 5/1983 | Sherwood et al. | 210/724 |
| 4,417,976 | 11/1983 | Sander et al. | 210/708 |
| 4,454,048 | 6/1984 | Brunbeck et al. | 210/726 |
| 4,600,514 | 7/1986 | Connor | 210/751 |
| 4,711,727 | 12/1987 | Matthews et al. | 210/728 |

FOREIGN PATENT DOCUMENTS

| 379791 | 2/1986 | Austria. |
| 0119179 | 3/1984 | European Pat. Off.. |
| 886130 | 8/1953 | Fed. Rep. of Germany. |
| 2742085 | 2/1980 | Fed. Rep. of Germany. |
| 3030558 | 10/1982 | Fed. Rep. of Germany. |
| 5916599 | 7/1982 | Japan .................. 210/728 |
| 58-6300 | 1/1983 | Japan. |

OTHER PUBLICATIONS

Grant and Hackh's Chemical Dictionary, Fifth Edition, p. 122.

Primary Examiner—Peter Hruskoci
Assistant Examiner—Krisanne Shideler
Attorney, Agent, or Firm—Birch, Stewart, Kolasch & Birch

[57] ABSTRACT

A method is provided for removing a solid phase from a liquid substance, which is kept in a continuous turbulent flow. The method is characterized by adding simultaneously at consecutive places in the flow direction of the liquid substance, cement, iron (III)-chloride-sulfate and an anion polyelectrolyte. Cement is added at a first place, iron (III)-chloride-sulfate at a second place and anion polyelectrolyte at a third place.

6 Claims, 1 Drawing Sheet

PROCESS FOR THE SEPARATION OF SOLID PHASE FROM LIQUID SUBSTANCE, PARTICULARLY FOR WASTE WATER PURIFICATION

FIELD OF THE INVENTION

The present invention relates to a process for the separation of a solid phase from a liquid substance. The process according to the invention is suitable for the treatment of liquids containing floating materials, emulsions, suspensions, dissolved or colloidal materials, as well as sludges and slurries, which are qualified as liquid substance in the present invention. However, the invention is mainly aimed at the treatment of waste waters.

BACKGROUND OF THE INVENTION

It is well known, that the amount of waste waters being produced has been increasing all over the world, as have the number of waste water varieties. Waste water runoffs running into soil and fresh waters cause serious environmental damages, and therefore their efficient purification is vitally important. However, in spite of all current efforts, only a relatively small part of the total amount of waste waters produced ever arrives at purification plants for treatment.

While water networks and consumption shown an upward trend in some areas, waste water purification capacities are usually either not available at all, or insufficient. Moreover, efforts aimed at intensifying existing waste water treatment capacity have not yielded any significant results, partly due to the high cost of investment required and partly due to the sluggishness of currently recommended methods.

Known processes used for purification of communal and other waste waters containing organic impurities are based on biological decomposition.

In the course of the treatment in various apparatuses in several steps and in several engineering structures (sandtrap, precipitator, aerator, after-precipitator, sludge treatment apparatus, etc.) the organic and inorganic impurities present in the waste water are transformed, utilized, and built-in by microorganisms propagated in the treatment system. A major part of the living organisms form a certain part of the waste water sludges, requiring further anaerobic or aerobic biological treatment. The need for this anaerobic treatment calls for additional engineering structures and involves considerable excess expendi-ture.

Because of the fairly long time required for the treatment of waste water with biological processes, a volume capacity well exceeding the volume corresponding to the daily amount of waste water arriving at the plants has to be available for optimal purification efficiency. But at the same time, waste water movement and aeration necessary to realize the conditions required for the bio-logical proceses can be solved with electric power-operated heavy-duty machinery. Even so, due to such factors, the specific cost of investment in biological waste water purification plants is very high. Moreover, the lower the purification capacity of the plant to be built, the higher the specific cost of investment required.

As complements to biological purification processes, secondary or tertiary chemical treatments are sometimes used, so that non-biologically or only partly decomposable com-ponents of the waste water are removed. In this regard, chemicals used for the purification of drinking water in-clude aluminum sulfate, lime milk, trivalent iron salts, polyelectrolytes, etc. Such chemicals are also used for the purification of the waste waters as well.

Industrial waste waters which do not, or mostly do not, contain organic impurities are commonly treated by mixing various chemicals with the waste water. The purpose of mixing in the chemicals is to neutralize and bind the chemicals passing from the industrial processes, before they enter into the waste water.

SUMMARY OF THE INVENTION

The present invention is aimed at the realization of a process for the separation of a solid phase from a liquid substance, in the purification of even the most diversified of waste waters, such as the treatment of slurries, sludges and sludge-like materials, whereby the phase-separation process can be efficiently completed in a very short time. With the invention, the quantity of waste water or other liquid substances which can be treated in a given engineering structure and in a unit of time that can be considerably increased compared to the traditional methods. Likewise, the specific costs of investment can also be greatly reduced.

The present invention is based on the following recognitions:

surface charges, which can influence the efficiency of coagulation and flocculation processes, as well as ZETA-potential, can be intensively reduced by bringing about a high-density adsorptive core during waste water treatment;

an appropriately selected coagulant aids in emulsion-decomposition and facilitates coagulation; and, floccules which develop in waste water treatment processes can be stabilized around an adsorptive core with the aid of a proper auxiliary clarifier.

The mentioned adsorptive core can be favorably produced by adding a cement of very large specific surface and high density, to a liquid kept in intensive mixing. The cement makes the liquid substance mildly alkaline (8–9 pH), creating favorable conditions for the use of iron (III)-chloride-sulfate as a basic clarifier (coagulating-flocculating agent), and an anion polyelectrolyte as an auxiliary clarifier. Moreover, upon adding such chemicals, coagulation and flocculation can both take place in the same step, since the cement grains—apart from their adsorption effect—are capable of changing the charge of the material particles floating in the waste water. Likewise, during the constant and intensive mixing, impurities are able to collide with each other and with the cement grains at high kinetic energy, so that as a result, impurities which are already mostly adsorbed, are also efficiently flocculated by the added $FeClSO_4$ and polyelectrolyte. Additionally, due to the high density of the infiltrated cement, the floccules—after reducing the intensity of the mixing and then stopping the mixing—settle very quickly. The floccules also remain stable despite the use of high mixing intensity and flow velocities, and as such, the liquid phase can be efficiently separated from the solid phase for example by decantation or quick filtration.

DETAILED DESCRIPTION OF THE INVENTION

Figure 1:
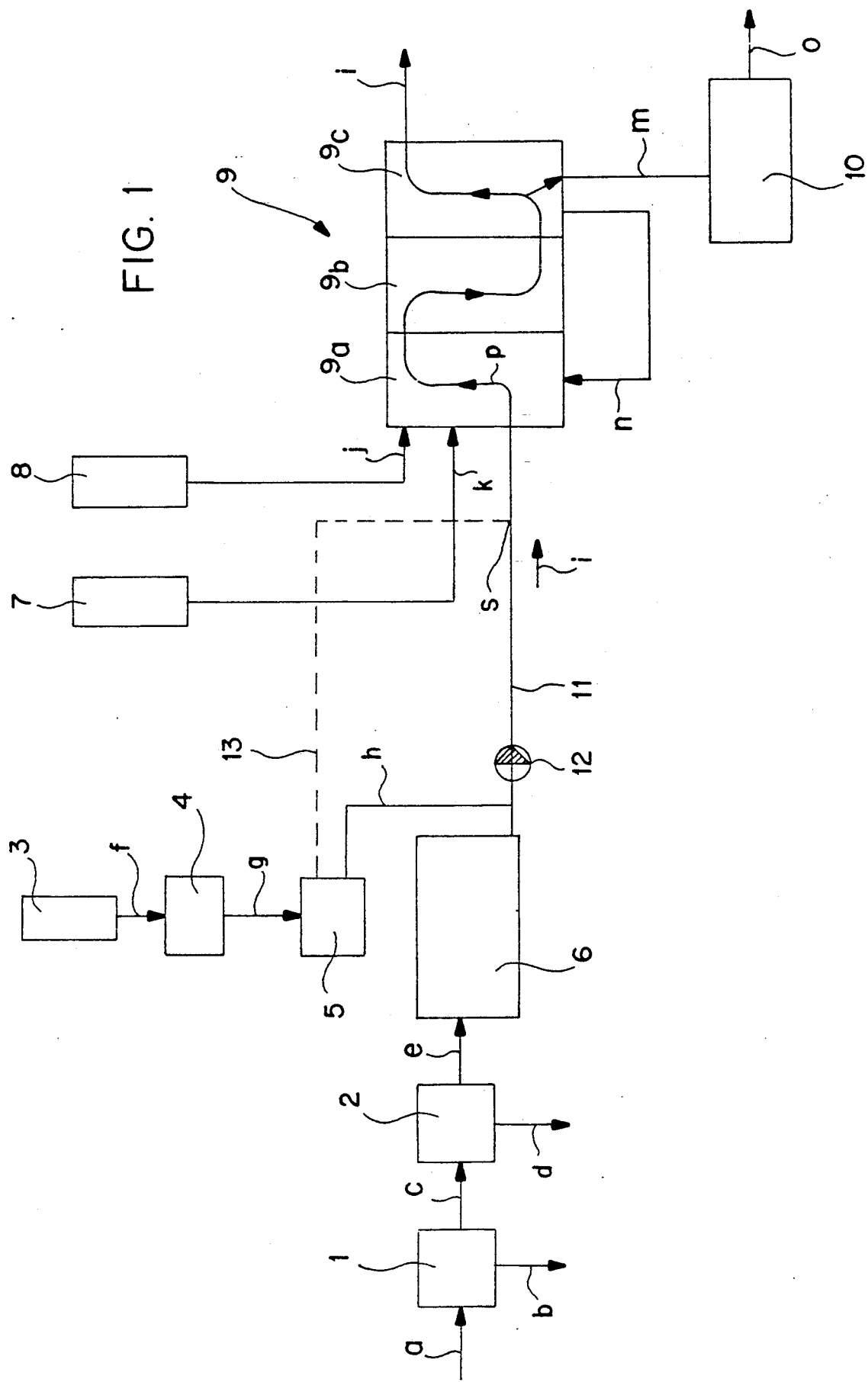
FIG. 1 a general block diagram of the present process.

On the basis of the above recognitions encountered by the present inventors, the problems encountered were solved with the process according to the invention. The process including simultaneously mixing cement, flocculating agent and coagulant with a liquid substance during a continuous turbulent flow of the liquid substance, the mixing occurring in the direction of the flow at consecutive places. For example, cement is added at a first place simultaneously with iron (III)-chloride-sulfate at a second place and an anion polyelectrolyte at a third place. The liquid substance is kept in turbulent motion during the additions either by a pumped or gravitational flow.

Generally 0.1–20.0 kg/m$^3$ of cement is mixed to the liquid substance to be treated, as is 67 g/m$^3$ of iron (III)-chloride-sulfate and 1–100 g/m$^3$ of an anion polyelectro-lyte. The time required for the complete mixing of chemicals is usually 30–60 sec., or less.

As a further criteria of the present invention, the liquid substance can be treated for a maximum of 120 seconds following completion of the mixing of the added polyelectrolyte. The cement, iron (III)-chloride-sulfate and polyelectrolyte are thus mixed together and the developed floccules are then left to settle. Upon completion of mixing the chemicals, the already developed giant floccules—though mixing slowing—are thus allowed to further impact for 1–2 minutes.

Finally, in order to reduce the use of chemicals, a second mode of implementation of the present inventive process may be favorable, whereby a certain part of the separated solid phase is recirculated to the liquid substance being treated. It is noted, that the chemical use of such a process is dependent on the allowed impurities in treated waste waters and desired output optimization by recirculating a certain part of the already settled sludge into the coagulation and flocculation zone of the apparatus used for implementation of the present inventive process.

The invention is further described in detail with the aid of the enclosed drawing (FIG. 1), as a general block diagram of the present processes.

In order to first remove impurities, scum etc., exceeding 10 mm in diameter, as well as sand, untreated waste water is conducted through screen 1 and sand-trap 2 according to arrows a and c, then it flows into the pumping station 6 according to arrow e. The removal of dirt on the screen is indicated by arrow b and that of the sand by arrow d. The waste water coming from the inlet chamber of the pumping station 6 is delivered to the reactor 9 by the pump 12 built into the pipe 11, and having nearly identical pumping intensity (arrow i.) In the present process, the cement may be added to the intensively mixed waste water, after the pumping station 6 to the suction side of the pump 12, or directly into the charging pipe 11 before the reactor 9 from pipe 13 shown with dashed line. The cement is stored in silo 3, from where it is fed to the powder feeder 4 in the direction of arrow f, then the required quantity of cement passes into the suspending unit 5 (arrow g), where a suspension is produced from the cement with the addition of water, and then it is transferred to pipe 11, leading to the reactor 9 according to arrow h or s.

An apparatus of a given capacity for implementation of the process according to the invention is basically flexible with respect to both quantitative and qualitative changes, however, to ensure simple operation, and to obtain the best efficiency it is advisable to conduct untreated waste water into the apparatus with constant or nearly constant intensity, which is ensured by the above described pumped delivery system. Favorable operation of such a system requires a minimum of 1 hour continuous running, hence the inlet chamber of the pump in the pumping station should be dimensioned for 1 hour of continuous operation. As a result of such measures, incidental pollution peaks can be damped and due to the compensation effect of the storage basin, charging of the chemicals does not have to follow fluctuation of the raw water's quality, which considerably simplifies the operation. With such a system, the chemical charges, once regulated, should only need to be corrected or changed if the quantitative and/or qualitative parameters of the untreated water change considerably.

The $FeClSO_4$ (as the active ingredient of a liquid clarifier product) is charged from tank 7 according to arrow k into the chemical mixing chamber 9a of the reactor 9, after charging the waste water mixed with cement, but at the same time polyelectrolyte is admitted in the form of solution from tank 8 according to arrow j. The upward flowing liquid (arrow p) is in intensive turbulent motion, the cement and chemicals efficiently mix with the waste water and with each other, and the coagulation and flocculation take place in a very short time (a few seconds). The mixed material passes into the after-flocculating chamber 9b of the reactor, where floccule-growing takes place in about 120 seconds. Finally, and similarly in a very short time, settling occurs in the reactor chamber 9c. From here, the sludge according to arrow m passes into the sludge dewatering unit 10, while the pumped water leaves in the direction of arrow 1. Part of the sludge according to arrow n can be recirculated from the reactor chamber 9c into the chemical mixing reactor chamber 9a, offering the opportunity for the saving of chemicals by utilizing the activity of the incidental surplus chemicals present in the sludge. The cement (cement suspension) washed with water passes to the suction side of the pump 12, built into the pipe 11 interconnecting the pumping station 6 with the reactor 9, or through pipe 13, marked with a dashed line, into pipe 11, before the reactor 9, the $FeClSO_4$ and polyelectrolyte are charged into the reactor 9 with charging pump (arrows j and k).

The dewatered sludge is removed from the sludge-dewatering unit 10 according to arrow o.

The pump starts automatically from the water level developing in the pumping station 6, and the cement and chemical chargers start at the same time without intervention of the operator. The required amount of chemicals is determined and set when the trial operation begins. Following the settling of the cement and chemical charges, the purification process begins immediately. Once the apparatus is started and with correct chemical charges, the quality of purified water is immediately satisfactory.

Pump operation by being based upon water level, gives an accurate liquid-part volume to be treated, to which accurate quantities of cement and chemicals can be added, depending on the liquid's (waste water) composition.

Regarding the liquid substances to be treated, general testing for decomposition of the waste water and determination of the optimal quantity of the cement and the other two chemicals to be added thereto, are based on laboratory tests. Adhering to the above detailed charging sequence, the cement and chemicals are charged during intensive mixing of the liquid substance to be treated, practically without interval or at least with only a minimal time-lag (a few seconds).

To determine the required treatment charges, 1 liter beakers can be filled with samples of the liquid substance to be treated, then different quantities of cement can be added to each sample. This is followed by adding varying quantities of iron (III)-chloride-sulfate during mixing, as well as an electrolyte as a finishing phase, to the contents of the beaker.

Iron (III)-chloride-sulfate (FeClSO$_4$) may be brought into contact with the liquid substance to be treated with a clarifier known in the trade by the name "ONGROFLOK", if desired. The active ingredient of this liquid product, having a density of 1.5-1.6 t/m$^3$, is FeClSO$_4$. The total Fe content of the product is about 200 kg/m$^3$ and its minimum Fe (III) content is 196 kg/m$^3$.

Returning to the subject of a series of test samples, the same can be visually inspected to determine how much of the chemicals and cement charges should be added to obtain the best purification efficiency (color, mirror-like transparency, etc.). An accurate value for the amount of chemicals and cement charges, so as to achieve optimal efficiency, is thus obtained by analytical measuring.

A cement having a large surface area and a high density is added in a quantity fixed according to the foregoing to the liquid substance during intensive mixing in an apparatus corresponding to the block diagram (FIG. 1), so that it can collide with floating solid materials, emulsified material particles present and/or dissolved materials in the suspension. The grain size and density of the cement may be varied. As a result of such mixing and the resulting partial dissolution of the cement, the liquid substance, e.g., untreated waste water, becomes mildly alkaline between 8 and 9 pH. Such a medium creates an especially favorable condition for the optimal clarifying effect of the FeClSO$_4$. As mentioned earlier, entry of the cement is immediately followed, under continuous intensive mixing, by entering the FeClSO$_4$ to the reactor chamber 9a, and directly afterwards an anion polyelectrolyte is then charged to the same place. The mixing is then continued, but meanwhile quickly settling macro-floccules are formed. The cement used in the present invention is a material of a large surface area and high density, and owing to constant mixing in the present processes, it changes the electric charge of pollution particles with which it collides. Furthermore, the cement can also adsorb particles. As a result of these factors, prior to mixing in the coagulation and flocculating chemicals, a preflocculation process occurs. Small floccules which are formed in such a preflocculation, are quickly increased in size to macro-floccules when the FeClSO$_4$ and polyelectrolyte are later added. The dissolved materials, the floating solid impurities and the emulsified or suspended components present in the liquid substance, infiltrate the macro-floccules during the chemical treatment described in the foregoing. Quick settling of the formed macro-floccules is explained by the fact, that the density of the infiltrated cement grains therein well exceeds the density of the other components of the macro-floccules. Thus, upon reducing or stopping the intensity of mixing, the floccules settle out at a high, 5-10 m/sec velocity. In reactors of a usual size, such a settling out of macro-floccules takes only a few seconds. The phase separation results also in purification of the waste water and the pH of the treated waste water is practically neutral. After treatment, the clean water (liquid phase) can be separated from the settled solid phase by decantation or quick filtration. Laboratory measurements also demonstrate that certain parameters associated with water purified with the process according to the present invention, are more favorable than parameters associated with waste waters purified, utilizing traditional biological methods.

The chemical sludge obtained by phase separation in the sludge-dewatering unit 10 quickly passes off its water content and hence, it can be efficiently desiccated with traditional sludge-dewatering methods, e.g., the use of a desiccating bed. The resultant dried material requires no composting, because it is nearly completely odorless and it is easily crumbled, it can also be effectively worked into the soil with cultivators. This, of course, is in contrast to the greasy and stinking sludges resulting from traditional biological purifiers.

The invention is further described in detail with the aid of the following Examples.

EXAMPLE 1

Sifted communal waste water is treated with the process according to the invention. The most important parameters of the untreated waste water from the purification technological point of view are the following:

| pH | 7.8 |
|---|---|
| ChON (chromium oxygen need) | 3240.0 mg/l |
| BON$_5$ (Biological oxygen need) | 870.0 mg/l |
| Fe | 3.2 mg/l |
| Ose (organic solvent extract) | 82.0 mg/l |

The admitted waste water is intensively mixed, for example, with pump-activated turbulent flow, while adding 1.5 kg/m$^3$ cement per waste water volume to be treated. Five minutes following the beginning of cement input, the addition of the liquid clarifier in an amount of 0.7 liter/m$^3$ known in the trade as "ONGROFLOK" is commenced. The FeClSO$_4$ content of "ONGROFLOK" is 670 g/l, i.e., 489 g iron (III)-chloride-sulfate is mixed to each m$^3$ of the waste water. After 5 seconds from the commencing of the charging of this ingredient, the anion polyelectrolyte is added to the waste water in the form of a clarifier known in the trade as "TEPROFLOK", the active ingredient content of which is 5 g/l. One liter of TEPROFLOK, i.e., 5 g active ingredient, is added to each m$^3$ of the waste water to be treated. The waste water, containing cement as clarifier, is further mixed for 30 seconds after ending the charging of polyelectrolyte. Upon completion of the mixing, the coagulated and flocculated macro-floccules, infiltrated by impurities of the communal waste water, settle very quickly at about 5-10 cm/s velocity. Removal of the settled sludge begins immediately. The sludge removal may be intermittent or continuous.

The characteristic biological parameters of the purified liquid phase are as follows:

| pH | 7.3 |
|---|---|
| ChON | 187.0 mg/l |
| BON$_5$ | 52.0 mg/l |
| Fe | 3.7 mg/l |
| Ose | 8.0 mg/l |

EXAMPLE 2

Communal waste water collected from a waste water canal network is purified with the process according to the invention, the most important purification technological parameters of the collected waters are the following:

| | |
|---|---|
| pH | 7.3 |
| ChON | 570.0 mg/l |
| BON$_5$ | 120.0 mg/l |
| Ose | 35.0 mg/l |
| Fe | 0.65 mg/l |

The procedure is the same as described in Example 1, with the difference that the treatment agents are charged in the following quantities:

| | |
|---|---|
| cement | 0.8 kg/m$^3$ |
| FeClSO$_4$ (active ingredient) | 201 g/m$^3$ |
| (0.31/m$^3$ "Ongroflok") | |
| polyelectrolyte (active ingredient) | 5 g/m$^3$ |
| (1 liter/m$^3$ "TEPROFLOK") | |

The most important characteristic parameters of the purified water after phase separation are the following

| | |
|---|---|
| pH | 7.2 |
| ChON | 80.0 mg/l |
| BON$_5$ | 22.0 mg/l |
| Ose | 2.5 mg/l |
| Fe | 0.71 mg/l |

EXAMPLE 3

Slaughterhouse waste water is treated with the process according to the invention. The most important purification technological parameters of this waste water are the following:

| | |
|---|---|
| pH | 6.9 |
| ChON | 5150.0 mg/l |
| BON$_5$ | 1060.0 mg/l |
| Ose | 350.0 mg/l |
| Fe | 0.58 mg/l |

2.5 kg/m$^3$ of cement is added to the waste water, which by utilizing flow, is intensively mixed. Three seconds following commencement of the cement charging, 0.81 liter/m$^3$ "Ongroflok" is added, representing 536 g/m$^3$ FeClSO$_4$ active ingredient, and 6 seconds thereafter, 2.0 liter/m$^3$ "TEPROFLOK" (10 g/m$^3$ active ingredient) is added to the intensively mixed waste water. The waste water and the components are mixed for 40 seconds, then the macrofloccules are left to settle.

The purified liquid obtained with phase separation is characterized by the following data:

| | |
|---|---|
| pH | 6.5 |
| ChON | 380.0 mg/l |
| BON$_5$ | 75.0 mg/l |
| Ose | 15.0 mg/l |
| Fe | 0.71 mg/l |

EXAMPLE 4

Milk-industrial waste water characterized with the following parameters is purified with the process according to the invention:

| | |
|---|---|
| pH | 6.4 |
| ChON | 4750.0 mg/l |
| BON$_5$ | 1100.0 mg/l |
| Ose | 270.0 mg/l |
| Fe | 0.6 mg/l |

The operations described in Example 3, are performed with the difference that the purifying agents are added in the following quantities:

| | |
|---|---|
| cement | 4.0 kg/m$^3$ |
| FeClSO$_4$ (active ingredient) | 1005.0 g/m$^3$ |
| (1.5 liter/m$^3$ "Ongroflok") | |
| polyelectrolyte (active ingredient) | 10.0 g/m$^3$ |
| (2.0 liter/m$^3$ "Teproflok") | |

The parameters of the clean liquid obtained by phase separation:

| | |
|---|---|
| pH | 6.2 |
| ChON | 640.0 mg/l |
| BON$_5$ | 105.0 mg/l |
| Ose | 20.0 mg/l |
| Fe | 0.9 mg/l |

EXAMPLE 5

Diluted pig manure having a slurry-like consistence is treated with the process according to the invention. The important characteristics with respect to purification technology are the following:

| | |
|---|---|
| pH | 6.2 |
| ChON | 437.0 mg/l |
| BON$_5$ | 1075.0 mg/l |
| Ose | 170.0 mg/l |
| Fe | 0.9 mg/l |

The procedure is the same as in Example 3, except the quantity of the purifying agents is as follows:

| | |
|---|---|
| FeClSO$_4$ (active ingredient) | 3.5 kg/m$^3$ |
| (1.5 l/m$^3$ "Ongroflok") | |
| polyelectrolyte (active ingredient) | 10 g/m$^3$ |
| (2.0 l/m$^3$ "Teproflok") | |

Parameters of the liquid phase obtained after separation of the solid phase are the following:

| | |
|---|---|
| pH | 6.2 |
| ChON | 860.0 mg/l |
| BON$_5$ | 98.0 mg/l |
| Ose | 28.0 mg/l |
| Fe | 1.1 mg/l |

EXAMPLE 6

An industrial machine oily emulsion is decomposed with the process according to the invention. The characteristic purification technological parameters of the emulsion are the following:

| pH | 6.9 |
|---|---|
| ChON | 35000.0 mg/l |
| Fe | 4.8 mg/l |
| Ose | 5200.0 mg/l |

5.0 kg/m$^3$ cement is added while the emulsion is mixed. Eight seconds following the addition of the cement, 1340 g/m$^3$ of FeClSO$_4$ as an active ingredient (2.0 l/m$^3$ "Ongroflok") is added to the intensively mixed emulsion. After 6 seconds lapsed from starting the addition of this material, 20 g/m$^3$ poly-electrolyte (4.0 l/m$^3$ "Teproflok") was mixed with the emulsion. Mixing of the material was continued for 50 seconds after charging the latter agent. The decomposed emulsion was flocculated to macro-floccules, which settled very quickly after the mixing was stopped. Parameters of the liquid derived by phase separation were the following:

| pH | 6.2 |
|---|---|
| ChON | 580.0 mg/l |
| Fe | 5.3 mg/l |
| Ose | 35.0 mg/l |

In the above described Examples, the treatment always takes place after retaining dirt on a screen without presettling. At most, to perform such a step, a sand-trap is needed. The Examples demonstrate that the amount of chemicals and cement used in the present process is different depending on the origin of the treated waste water and characteristics of the pollutants therein. At the same time, the Examples also show that the effectiveness of the purification process of the present invention.

It should be stressed, that fresh waste waters were treated in all the above Examples, which factor is not indifferent to the determination of the purification efficiency of the present process (since decayed waste waters can be more easily treated).

The sludge containing pollutants with the present process, generally settle in about 1-2 seconds, the quantity settled is usually 20-50 ml/l. After gravitational dewatering, the extract content of the sludge is about 30%.

Favorable effects of the invention include the following:

The technological time needed for chemical purification according to the present invention is less by several orders of magnitude, than the time required for biological processes, and consequently, the cost of engineering structures and accompanying investments is considerably lower than that of traditional biological purifications. Accordingly, the need for purification space, as well as the need for structures necessary for the realization of the process of the present invention, are less than those associated with presently known solutions for waste water treatment facilities.

The process can be performed in a simple way and realized by utilizing apparatuses with minimal manual labor, since the operation can be easily automated.

Mixing which is absolutely necessary in the present process may be realized not only with mechanical means, but also with compressed air, and even with the intensive flow of the liquid substance being treated. In this regard, the intensive flow of the liquid substance is qualified as mixing, since one may utilize the liquid flow entering the reactor to mix the cement and flocculating agents, and thus efficiently disperse the same.

Due to the small space required for the technological apparatuses disclosed herein, a relatively high capacity waste water purification unit can be economically installed within a building, whereby the environment upsetting effects of a waste water purification plant can be reduced to a minimum. With such a plant, waste water purification can be realized near a populated area, and consequently the construction cost of canal networks can be lowered, since traditional waste water purification apparatuses are generally built far from populated areas.

With the process according to the invention, apparatuses suitable for the efficient purification of a small amount of waste water, can be economically established, which are extremely favorable, because the specific costs of construction are lower than in traditional systems, the quantity of daily purified waste water, which can be treated, is greater. The process is not sensitive to the quantitative fluctuation of the arriving waste water, or to changes in its composition, because the fluctuations and changes of composition can be well followed by changing the quantity of cement and flocculating agents. The process according to the present invention can be used to increase purifying capacity and, even combined with traditional purification methods for compensating the peak loads of existing purification plants, which are generally biological waste water plants. As mentioned before, the sludge (solid phase), obtained with the process has excellent characteristics, since it is easily dewatered, nearly odorless after drying, can be easily worked into the soil, and because the cement used in the process is not anti-environmental material. Moreover, the cement from an agronomic point of view, it may be advantageous in certain soils by its structure-improving effect. Naturally, the sludge can be deposited in communal dumping grounds, where by its composition and manageability, it is suitable for covering such dumping grounds.

The total purification efficiency of the invention, which is referred to chromium oxygen need, generally reaches 80%, while oil and fat removal efficiency, which is expressed in organic solvent extract, is at most a minimum of 95%. With the use of chemicals, the impurities pass into the precipitation, and the pollution-concentration in the watery eluate of the precipitation is insignificant.

The quality of water purified with the present process can be further improved with oxidation, and, in a given case after disinfection, it can be delivered into fresh water.

In dimensioning the apparatus used for realization of the process according to the present invention, the surface load can be taken into account with a minimum value of 5 m$^3$/m$^2$h, which is an extremely favorable figure.

When industrial waste waters containing dangerous materials, e.g., heavy metal ions are purified with the process according to the present invention, the quality of the obtained water phase permits entry to the communal canal. Alternatively, the water phase, for example, in the case of car-washers, can be used again by recirculation.

Naturally, the present invention is not restricted to the previous Examples, and it can be realized in many ways within the protective circle defined by the following claim points. The process is suitable for the treatment of all such liquids, where impurities are formed by floating materials, or where they occur in a colloidal form, in an emulsion, in a suspension, or in a dissolved form. The process may be used to efficiently remove floating and colloidal materials from waste waters, as well as to remove oils, detergents, fats, pigments, phosphates, etc. At the same time, the present invention is also suitable for the treatment of sludges and slurries as well.

We claim:

1. A process for the separation of a solid phase from a liquid substance in the course of which a cement, a flocculating agent and a coagulant are mixed with the liquid substance, wherein the process comprises developing a continuous turbulent flow of the liquid substance, and at consecutive places in the flow direction of the liquid substance, simultaneously adding to the liquid substance the following:

cement at a first place, iron (III)-chloride-sulfate as the flocculating agent at a second place and an anionic polyelectrolyte as the coagulant at a third place;

followed by the steps of allowing solid phase floccules to form, allowing the floccules to settle, and separating the floccules from the liquid substance.

2. The process according to claim 1, wherein 0.1–20.0 $kg/m^3$ of the cement is added to the liquid substance to be separated.

3. The process according to claim 1 or 2, wherein 67 $g/m^3$–3350 $g/m^3$ of the iron (III)-chloride-sulfate is added to the liquid substance to be separated.

4. The process according to claim 1 or 2, wherein 1–100 $g/m^3$ of the anionic polyelectrolyte is added to the liquid substance to be separated.

5. The process according to claim 1 or 2, wherein a certain part of the separated solid phase is recirculated to the liquid substance to be separated.

6. The process according to claim 1 or 2, wherein for a maximum of 120 seconds following completion of the addition of the cement, the iron (III)-chloride-sulfate and the polyelectrolyte, the mixture comprising the liquid substance to be separated, the cement, the iron (III)-chloride-sulfate and the polyelectrolyte is mixed together, and then floccules which have developed during mixing are allowed to settle.

* * * * *